(12) United States Patent
Xu

(10) Patent No.: US 11,460,693 B2
(45) Date of Patent: Oct. 4, 2022

(54) LENS AND LENS ASSEMBLY

(71) Applicant: AAC Optics Solutions Pte. Ltd., Singapore (SG)

(72) Inventor: Lingyun Xu, Shenzhen (CN)

(73) Assignee: AAC Optics Solutions Pte. Ltd., Singapore (SG)

( * ) Notice: Subject to any disclaimer, the term of this patent is extended or adjusted under 35 U.S.C. 154(b) by 283 days.

(21) Appl. No.: 16/992,082

(22) Filed: Aug. 12, 2020

(65) Prior Publication Data

US 2021/0048666 A1 Feb. 18, 2021

(30) Foreign Application Priority Data

Aug. 15, 2019 (CN) .......................... 201910752627.5

(51) Int. Cl.
*G02B 27/00* (2006.01)
*G02B 7/02* (2021.01)
*G02B 3/08* (2006.01)
*G02B 3/00* (2006.01)

(52) U.S. Cl.
CPC ........... *G02B 27/0018* (2013.01); *G02B 3/08* (2013.01); *G02B 7/021* (2013.01); *G02B 2003/0093* (2013.01)

(58) Field of Classification Search
CPC ...... G02B 27/0018; G02B 3/08; G02B 7/021; G02B 7/022
See application file for complete search history.

(56) References Cited

U.S. PATENT DOCUMENTS

2020/0409108 A1* 12/2020 Ma .......................... G02B 7/022

* cited by examiner

*Primary Examiner* — Ryan D Howard
(74) *Attorney, Agent, or Firm* — W&G Law Group

(57) ABSTRACT

Provided are a lens and a lens assembly including a lens barrel defining a receiving space and provided with a light-through hole and the lens received in the receiving space. The lens includes an optical portion for imaging and a peripheral portion provided with through holes penetrating through the peripheral portion along an optical axis of the lens. The through holes are distributed on circumferences of different diameters, centers which are located on the optical axis. The farther the circumference is from the optical axis, the more through holes are arranged on the circumference. When light enters regions of the lens where the through holes are arranged, stray light is absorbed, effectively reducing the reflection of the stray light at the peripheral portion and improving imaging quality. The through holes do not affect assembly accuracy of the lens and reduce appearance yield of the lens or increase cost.

10 Claims, 3 Drawing Sheets

LENS AND LENS ASSEMBLY

TECHNICAL FIELD

The present invention relates to the field of optical imaging technology and, in particular to, a lens and a lens assembly.

BACKGROUND

With the development of imaging technology and the wide use of electronic products with image-capturing functions, optical lens assemblies are widely used in various fields of life. In the related art, in order to avoid the light that enters the lens assembly from different angles from being reflected multiple times in the lens assembly and forming stray light interference, the periphery of the lens is usually covered with an extinction film for light extinction or subjected to a black plating processing. The assembling of the lenses after the surfaces of the lenses are covered with extinction films, will reduce the assembly accuracy between the lenses. In addition, the black plating processing will reduce the appearance yield of the lenses and increase cost.

SUMMARY

An object of the present invention is to provide a lens and a lens assembly, aiming to solve the problems in the related art that covering the lens surface with an extinction film will affect the assembly accuracy between the lenses and the black plating processing will reduce the appearance yield of the lens and increase cost.

A lens includes an optical portion for imaging, and a peripheral portion surrounding the optical portion. The peripheral portion is provided with a plurality of through holes, each of the plurality of through holes penetrates through the peripheral portion along an optical axis of the lens, the plurality of through holes is distributed on a plurality of circumferences of different diameters, and centers of the plurality of circumferences are located on the optical axis. For two circumferences of the plurality of circumferences, in which one circumference is farther from the optical axis than the other circumference, more through holes of the plurality of through holes are distributed on the one circumference than the other circumference.

As an improvement, each of the plurality of through holes has a diameter of 0.04 mm.

As an improvement, at least two through holes of the plurality of through holes on one circumference of the plurality of circumferences are equally spaced from one another.

As an improvement, at least one through holes of the plurality of through holes on one of the plurality of circumferences that is closest to the optical portion is spaced apart from an outer edge of the optical portion.

As an improvement, at least one through holes of the plurality of through holes on one of the plurality of circumferences that is farthest from the optical portion is spaced apart from an outer edge of the lens.

The present invention also provides a lens assembly. The lens assembly includes a lens barrel defining a receiving space and provided with a light-through hole; and a lens received in the receiving space. The lens includes an optical portion for imaging and a peripheral portion surrounding the optical portion. The peripheral portion is provided with a plurality of through holes, each of the plurality of through holes penetrates through the peripheral portion along an optical axis of the lens, the plurality of through holes are distributed on a plurality of circumferences of different diameters, and centers of the plurality of circumferences are located on the optical axis. For two circumferences of the plurality of circumferences, in which one circumference is farther from the optical axis than the other circumference, more through holes of the plurality of through holes are distributed on the one circumference than the other circumference.

As an improvement, each of the plurality of through holes has a diameter of 0.04 mm.

As an improvement, at least two through holes of the plurality of through holes on one circumference of the plurality of circumferences are equally spaced from one another.

As an improvement, at least one through hole of the plurality of through holes on one of the plurality of circumferences that is closest to the optical portion is spaced apart from an outer edge of the optical portion.

As an improvement, at least one through hole of the plurality of through holes on one of the plurality of circumferences that is farthest from the optical portion is spaced apart from an outer edge of the lens.

In the present invention, the peripheral portion of the lens is provided with through holes penetrating through the peripheral portion along the optical axis direction of the lens, and the through holes are distributed on the plurality of circumferences having different diameters and a same center, and are arranged in a honeycomb shape in the peripheral portion. When the light enters a region of the lens where the through holes are provided with, stray light will be absorbed, which can effectively reduce the reflection of the stray light at the peripheral portion and improve the imaging quality. Besides, the through holes will not affect the assembly accuracy of the lens, and will neither reduce the appearance yield of the lens nor increase the cost.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present invention. Moreover, in the drawings, like reference numerals designate corresponding parts throughout the several views.

DESCRIPTION OF EMBODIMENTS

The present invention will be described in further detail through embodiments in conjunction with the accompanying drawings.

Figure 1:
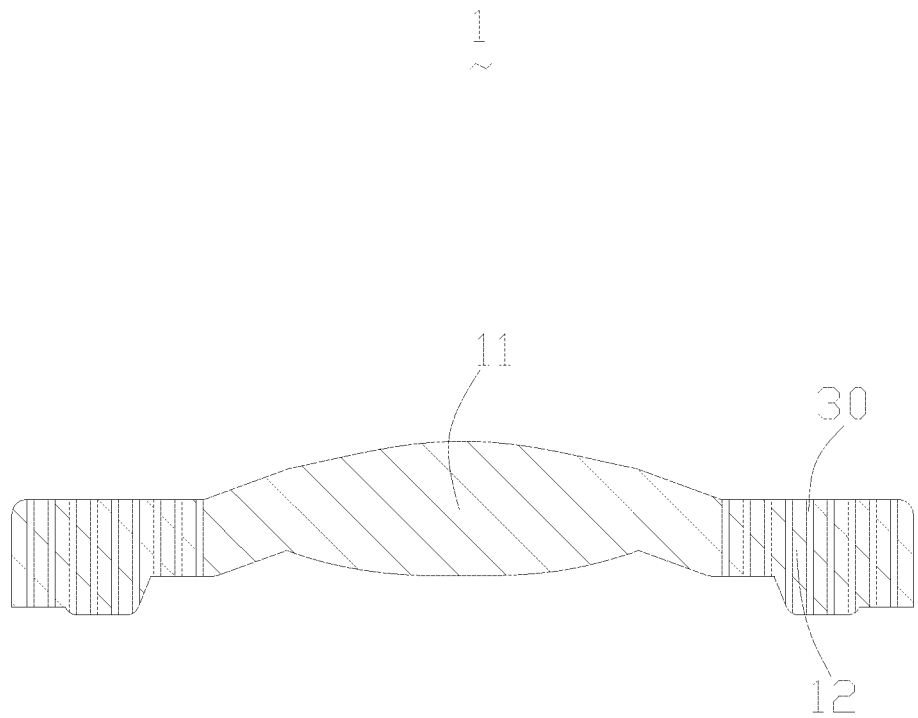
FIG. 1 is a schematic diagram of an overall structure of a lens.
Figure 2:
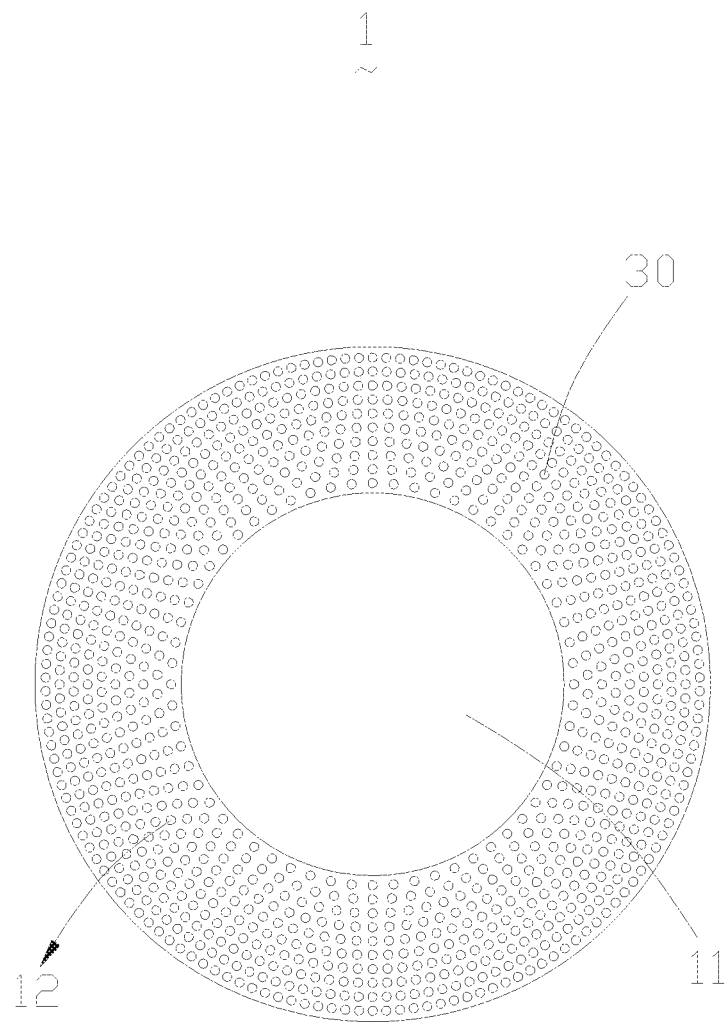
FIG. 2 is a schematic structural diagram of a lens from another perspective.

As shown in FIG. 1 and FIG. 2, an embodiment of the present invention provides a lens 1. The lens 1 includes an optical portion 11 for imaging and a peripheral portion 12 surrounding the optical portion 11. The peripheral portion 12 is provided with through holes 30 which penetrate through the peripheral portion 12 along an optical axis of the lens 1.

In an embodiment, the through holes 30 are distributed on a plurality of circumferences of different diameters, and centers of the plurality of circumferences is located on the optical axis. That is, the plurality of circumferences of the peripheral portion 12 are concentric circumferences. A distance between the optical axis and one circumference of any two circumferences of the plurality of circumferences is greater than a distance between the optical axis and the other circumference of the any two circumferences, and the number of through holes 30 on the one circumference is greater than the number of through holes 30 on the other circumference. Of course, the specific number of through holes 30 on each circumference can be set according to actual needs, which is not limited in this embodiment.

By providing the through holes 30 penetrating through the peripheral portion 12 along the optical axis direction of the lens 1 in the peripheral portion of the lens 1, the through holes 30 are arranged in the peripheral portion 12 in a honeycomb shape. When light enters a region of the lens 1 where the through holes 30 are arranged, stray light will be absorbed, which can effectively reduce the reflection of the stray light at the peripheral portion 12 and improve the imaging quality. Besides, the through holes 30 will not affect the assembly accuracy of the lens 1, and will neither reduce the appearance yield of the lens 1 nor increase the cost.

In an embodiment, the through holes 30 on one circumference are equally spaced apart from one another. In another embodiment, the through holes 30 on one circumference can be not equally spaced apart from one another. In an embodiment, the through hole 30 on the circumference closest to the optical section 11 is spaced apart from an outer edge of the optical portion 11, and the through hole 30 on the circumference farthest from the optical portion 11 is spaced apart from an outer edge of the lens 1, avoiding affecting the appearance of the lens 1 and causing an unaesthetic look of the lens 1. In an embodiment, the through hole 30 has a diameter of 0.04 mm.

Figure 3:
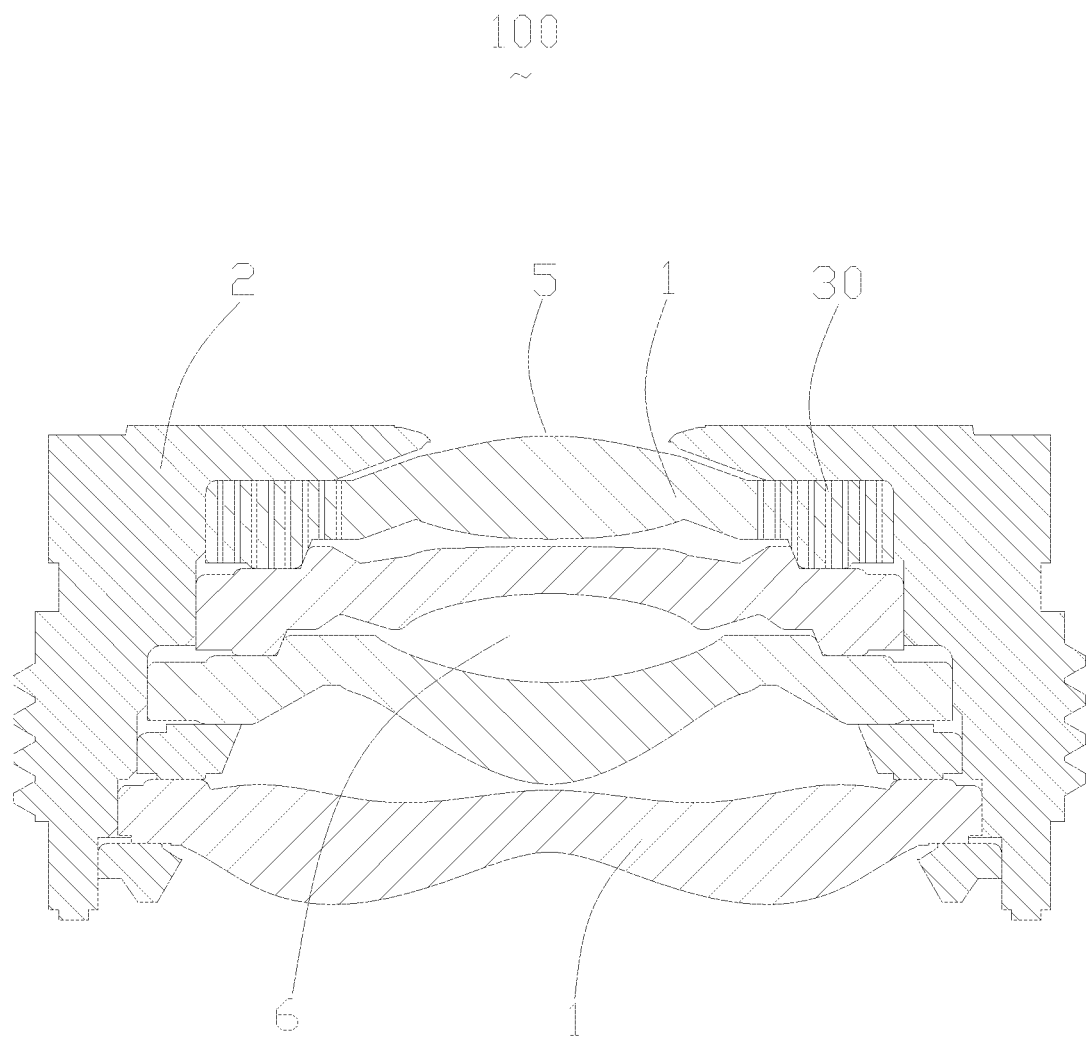
FIG. 3 is a schematic diagram of an overall structure of a lens assembly.

An embodiment of the present invention further provides a lens assembly 100. As shown in FIG. 3, the lens assembly 100 includes a lens barrel 2, and the lens barrel 2 defines a receiving space 6 and is provided with a light-through hole 5, and the above-described lens 1 received in the receiving space 6 (this embodiment will be described by taking the lens 1 closest to an object side as an example). The optical portion 11 of the lens 1 corresponds to the light-through hole 5. In this way, when light enters through the light-through hole 5 and strikes the regions of the lens 1 where the through holes 30 are arranged, the reflection of the stray light by the peripheral portion 12 can be effectively reduced, thereby improving the imaging quality.

The above are merely embodiments of the present invention. It should be noted here that those of ordinary skill in the art can make improvements without departing from the inventive concept of the present invention, but these belong to the protection scope of the present invention.

What is claimed is:

1. A lens, comprising:
an optical portion for imaging; and
a peripheral portion surrounding the optical portion,
wherein the peripheral portion is provided with a plurality of through holes, each of the plurality of through holes penetrates through the peripheral portion along an optical axis of the lens, the plurality of through holes is distributed on a plurality of circumferences of different diameters, and centers of the plurality of circumferences are located on the optical axis; and
wherein for two circumferences of the plurality of circumferences, in which one circumference is farther from the optical axis than the other circumference, more through holes of the plurality of through holes are distributed on the one circumference than the other circumference.

2. The lens as described in claim 1, wherein each of the plurality of through holes has a diameter of 0.04 mm.

3. The lens as described in claim 1, wherein at least two through holes of the plurality of through holes on one circumference of the plurality of circumferences are equally spaced apart from one another.

4. The lens as described in claim 1, wherein at least one through hole of the plurality of through holes, on one of the plurality of circumferences that is closest to the optical portion is spaced apart from an outer edge of the optical portion.

5. The lens as described in claim 1, wherein at least one through hole of the plurality of through holes on one of the plurality of circumferences that is farthest from the optical portion is spaced apart from an outer edge of the lens.

6. A lens assembly, comprising:
a lens barrel defining a receiving space and provided with a light-through hole; and
a lens received in the receiving space, wherein the lens comprises an optical portion for imaging and a peripheral portion surrounding the optical portion, wherein the peripheral portion is provided with a plurality of through holes, each of the plurality of through holes penetrates through the peripheral portion along an optical axis of the lens, the plurality of through holes are distributed on a plurality of circumferences of different diameters, and centers of the plurality of circumferences are located on the optical axis; and
wherein for two circumferences of the plurality of circumferences, in which one circumference is farther from the optical axis than the other circumference, more through holes of the plurality of through holes are distributed on the one circumference than the other circumference.

7. The lens assembly as described in claim 6, wherein each of the plurality of through holes has a diameter of 0.04 mm.

8. The lens assembly as described in claim 6, wherein at least two through holes of the plurality of through holes on one circumference of the plurality of circumferences are equally spaced from one another.

9. The lens assembly as described in claim 6, wherein at least one through hole of the plurality of through holes on a circumference of the plurality of circumferences that is closest to the optical portion is spaced apart from an outer edge of the optical portion.

10. The lens assembly as described in claim 6, wherein at least one through hole of the plurality of through holes on a circumference of the plurality of circumferences that is farthest from the optical portion is spaced apart from an outer edge of the lens.

* * * * *